(12) United States Patent
Colyar et al.

(10) Patent No.: US 8,673,135 B2
(45) Date of Patent: Mar. 18, 2014

(54) COAL LIQUEFACTION COMPLEX WITH MINIMAL CARBON DIOXIDE EMISSIONS

(75) Inventors: James J. Colyar, Newtown, PA (US); James B MacArthur, Denville, NJ (US); Michael Peluso, Hamilton Square, NJ (US)

(73) Assignee: Axens, Rueil-Malmaison (FR)

( * ) Notice: Subject to any disclaimer, the term of this patent is extended or adjusted under 35 U.S.C. 154(b) by 820 days.

(21) Appl. No.: 12/800,988

(22) Filed: May 28, 2010

(65) Prior Publication Data
US 2011/0290703 A1 Dec. 1, 2011

(51) Int. Cl.
*C10G 1/06* (2006.01)
*B01D 53/14* (2006.01)

(52) U.S. Cl.
USPC .............. 208/427; 208/3; 208/400; 208/408; 423/220; 423/248; 95/96; 95/236

(58) Field of Classification Search
USPC .............. 208/3, 400, 407, 408, 426, 427; 423/220, 248, 437.1; 95/236, 96
See application file for complete search history.

(56) References Cited

U.S. PATENT DOCUMENTS

| | | | | |
|---|---|---|---|---|
| 4,097,361 | A * | 6/1978 | Ashworth | 208/408 |
| 4,869,894 | A * | 9/1989 | Wang et al. | 423/650 |
| 6,103,143 | A * | 8/2000 | Sircar et al. | 252/373 |
| 7,157,167 | B1 * | 1/2007 | Muradov | 429/411 |
| 7,208,530 | B2 * | 4/2007 | Norbeck et al. | 518/704 |
| 2008/0314801 | A1 * | 12/2008 | Menzel | 208/343 |

* cited by examiner

*Primary Examiner* — Renee E Robinson

(57) ABSTRACT

The invention described herein relates to a novel process for reducing the carbon dioxide emissions from a coal and/or biomass liquefaction facility by utilizing a steam methane reformer unit in the complex designed to produce additional hydrogen which can be thereafter utilized in the process, as required for the plant fired heaters (including the SMR furnace), and for the production of plant steam. The plant light ends ($C_1$, $C_2$, etc.), which are normally utilized as fuel gas streams are the primary feeds to the SMR Unit along with the tail gas purge from a gasification complex within the facility.

12 Claims, 3 Drawing Sheets

COAL LIQUEFACTION COMPLEX WITH MINIMAL CARBON DIOXIDE EMISSIONS

FIELD OF THE INVENTION

Climate change concerns have increased awareness over the level of carbon dioxide ($CO_2$) emissions from various refinery processes and facilities which convert low-valued hydrocarbons to more useful fuels. Applicants disclose an efficient and effective technique for reducing the carbon dioxide emissions from a coal and/or biomass to liquids facility (CBTL) by capturing the carbon dioxide in a centralized facility and providing fuel gas low in carbon to process fired heaters, which account for a high percentage of carbon emissions at a typical CBTL facility.

BACKGROUND OF THE INVENTION

The two primary approaches for coal refining for the purpose of converting coal to liquid fuels are called direct and indirect coal liquefaction. Direct coal liquefaction (DCL) reacts coal in a solvent with hydrogen at high temperature and pressure to produce liquid fuels. DCL was first developed in Germany in 1913 and used commercially in Germany between 1927 and 1945. However, after World War II, crude oil was widely available at reasonable prices and the implementation of coal liquefaction was therefore not commercially attractive. As a result, only a small quantity of liquid fuels sold today is produced using a coal liquefaction process.

Indirect coal liquefaction (ICL) involves first gasifying coal to produce a synthesis gas which contains principally carbon monoxide and hydrogen and thereafter catalytically processing the gas chemically into a variety of liquid fuels.

Where diesel type products are desired, ICL plus the Fischer-Tropsch process is preferably used to convert the synthesis gas. The ICL technology was commercially applied in the 1920-1940's in Germany and since the 1950's in South Africa. While commercially demonstrated, the ICL technologies are very complex, capital intensive, and have low thermal efficiencies compared to direct coal liquefaction.

An important DCL technology is the H-Coal Process which was invented by Hydrocarbon Research, Inc. and is generally described in U.S. Pat. Nos. 3,519,553 and 3,791,959. The H-Coal Process uses a single ebullated-bed reactor with a hydroconversion catalyst to convert coal to liquid fuels. The ebullated-bed reactor is unique in its ability to process solids containing streams in the presence of high activity hydrogenation catalyst particles. Product oil (400° F.$^+$) was used to slurry the coal for feeding to the reactor. Coal liquefaction took place at temperatures of 800-875° F., and hydrogen partial pressures of 1500-2500 psia. With Illinois No. 6 coal, liquid yields of greater than 50 w % on DAF Coal were achieved during the multi-year year demonstration program at the 200 ton per day H-Coal Pilot Plant in Catlettsburg, Ky. The DCL technologies demonstrated commercial readiness, however, no commercial projects proceeded as oil prices fell and oil supplies increased.

In the 1980's and 1990's research continued at a smaller scale to improve the DCL technologies and reduce investments and operating costs. The Catalytic Two-Stage Liquefaction Process (H-Coal$_{TS}$) was invented by Hydrocarbon Research, Inc., as described in U.S. Pat. Nos. 4,842,719, 4,874,506, and 4,879,021, to substantially increase the yield of distillate liquids from coal. For Illinois No. 6 bituminous coal, liquid yields were increased from 3 barrels per ton of DAF coal for the single stage H-Coal Process to about 5 barrels per ton of DAF coal for the H-Coal$_{TS}$ Process. This was achieved by dissolving the coal feed at mild conditions while simultaneously hydrogenating the coal recycle solvent and coal liquids produced at temperatures from 600-800° F., hydrogen partial pressures of 1500-2500 psia in the presence of a hydrogenation catalyst.

In the H-Coal$_{TS}$ Process, the unreacted coal from the initial stage is then fed to a direct-coupled second stage reactor operating at higher temperatures of approximately 800-850° F. and at similar pressures (1500-2500 psia) with a hydroconversion catalyst, to achieve maximum coal conversion and high distillate liquid yields. The hydrogenation catalyst used for the single-stage and two-stage processes deactivates at these reactor conditions due to the deposition of coke and also soluble metals from the coal feed if present.

Whether in a direct or indirect coal liquefaction process, process fired heaters are collectively a major source of carbon dioxide emissions. In a typical direct coal liquefaction facility, for example, approximately fifty percent (50%) of the carbon dioxide emitted to the atmosphere originates from process fired heaters. These fired heaters combust natural gas, refinery fuel gas or liquid fuel oil with air and emit a flue gas which is relatively dilute (15 V % or less) in $CO_2$ with nitrogen present as the primary gas. Although technology exists for capturing the dilute $CO_2$ from this stream, it is highly capital intensive and not practiced commercially.

Another method for recovering $CO_2$ from the fired heater flue gas involves feeding of purified oxygen from an air separation plant to the fired heaters. This significantly increases the $CO_2$ concentration in the fired heater flue gas where it is more economic to recover $CO_2$ after removal of sulfur species, particulates and water. However, this configuration requires a recycle of $CO_2$ to the furnace to moderate the resulting temperature and also results in high investment and operating costs primarily related to the air separation plant and is not economically practical. Additionally, separate $CO_2$ capture facilities may be needed for each fired heater.

As a result of the need for an efficient and economical technique for reducing the $CO_2$ emissions in these CBTL (Coal and/or Biomass to Liquids) facilities, applicant herein discloses a novel process to eliminate the need for post combustion $CO_2$ capture from fired heaters (at atmospheric pressure and in dilute phase) by adding a steam methane reformer (SMR) unit to the complex to produce additional process, hydrogen as well as the hydrogen fuel needed for the process fired heaters.

Relative to existing technologies and process configurations for $CO_2$ capture, the invention will have significantly improved economics and will result in the capture in excess of 70-percent of the $CO_2$ produced in a DCL facility. The original concept was developed for DCL, although the invention can also be applied to ICL as well as for coal, biomass, and petroleum co-processing. In the text, the term H-Coal$_{TS}$ is used for any liquefaction process in one, two or more steps for treating a carbonaceous material.

In a DCL facility, the unconverted coal and vacuum residue portion of the coal liquefaction products are typically routed to a gasifier to produce a portion of the required hydrogen. Hydrogen is required for both the coal liquefaction reactors and in the secondary hydrotreating/hydrocracking steps. In a DCL facility that does not utilize the Applicant's invention, the remaining required hydrogen is typically produced by the gasification of additional coal or by the steam methane reforming (SMR) of the produced fuel gas and/or natural gas.

When it is necessary to capture $CO_2$ to prevent its release to the atmosphere, several commercially available technologies such as Selexol and Rectisol or amine solutions can be used to recover $CO_2$ from the gasification or SMR synthesis gases.

However, significant $CO_2$ emissions remain from the plant fired heaters and steam boiler where tail gas, plant fuel gas, imported natural gas or fuel oil are used as fuel. In a typical DCL plant processing Illinois No. 6 bituminous coal, approximately 50% of the $CO_2$ emissions originate from fired heaters with the remaining originating from the gasification and SMR plants. By adding $CO_2$ capture to the hydrogen production plants (gasification and SMR), only about 50 to 70% of the total $CO_2$ produced in the facility can be captured.

Applicant's invention represents a dramatic improvement over the conventional designs as described above. Applicant's adds additional SMR plant capacity or a new SMR Unit to the complex designed to produce additional hydrogen which can be thereafter utilized for the process consumers, as required for the plant fired heaters (including the SMR furnace), and for the production of plant steam. The plant light ends ($C_1$, $C_2$, etc.), which are normally utilized as fuel gas streams are the primary feeds to the SMR Unit along with the tail gas purge from the Gasifier Pressure Swing Absorber (PSA) unit.

The SMR synthetic gas (syngas) is shifted using a water gas shift unit and the $CO_2$ thereafter recovered utilizing an absorber. The tail gas from the SMR PSA is recycled to the SMR reactor with a small purge used for the SMR furnace fuel. All flue gases from the plant are greatly reduced in $CO_2$ content or nearly $CO_2$ free since high purity hydrogen is utilized as fuel. The design of the SMR is optimized so that the required hydrogen is produced while the plant steam requirements are also balanced.

The invention is applied where $CO_2$ capture is required to meet environmental requirements. $CO_2$ capture technology is initially added to the hydrogen production process (gasification and/or SMR). Next, the feeds to the SMR (reactor and furnace) and the type of fuel to the plant fired heaters are modified to minimize the release of $CO_2$ to the atmosphere. The invention thus comprises the following features: 1) inclusion of a SMR Unit to produce process hydrogen as well as the fuel for plant fired heaters, 2) routing of the carbon-rich gasifier PSA tail gas to the SMR feed, 3) inclusion of $CO_2$ recovery in both the gasification and SMR Units, 4) recycle of nearly all the SMR PSA tail gas to the SMR reactor feed with a small purge to the SMR furnace to reduce inerts such as nitrogen, argon in the hydrogen product, and 5) optimization of the SMR design to produce the required hydrogen while also balancing the plant steam requirements.

SUMMARY OF THE INVENTION

The invention described herein relates to processes that combine the pre-combustion, capture of carbon dioxide with production of a hydrogen-rich fuel source within a facility treating carbonaceous material by liquefaction (often called in the text CBTL facility i.e. Carbon and/or Biomass to Liquids conversion facility) to drastically reduce the carbon dioxide emissions from the plant. The hydrogen-rich fuel is utilized for the process fired heaters and the fuel quality (carbon content) can be set to meet the refinery's $CO_2$ emissions objectives. Moreover, the $CO_2$ captured can be sequestered and/or utilized for enhanced oil recovery (EOR).

More precisely, the invention concerns a process for reducing the carbon dioxide emissions in a facility treating carbonaceous material by liquefaction comprising:
a) feeding a first feed of carbonaceous material and hydrogen under liquefaction conditions to one or more liquefaction reactors to create a light ends stream, a distillate stream, and a heavy ends; and separating from said light ends stream a LPG stream, a naphtha stream and a fuel gas;
b) gasifying said heavy ends and a second feed of carbonaceous material in a gasification complex comprising a gasifier reactor, a sour gas removal unit, a water gas shift unit, a carbon dioxide absorption unit, and a hydrogen purification unit, and recovering a purified hydrogen, a tail gas purge stream and a carbon dioxide rich stream;
c) feeding said tail gas purge stream, said fuel gas recovered from the light ends stream in step a), and a recycled purge gas stream from step f) to the reactor section of a steam methane reformer unit comprising said reactor section and a furnace section, to create a synthetic gas stream;
d) shifting said synthetic gas stream catalytically using a water gas shift unit to create a shifted synthetic gas stream;
e) capturing the carbon dioxide from said shifted synthetic gas stream through a carbon dioxide absorption process;
f) purifying the hydrogen remaining in said shifted synthetic gas stream after step e) in a hydrogen purification unit to create at least a hydrogen fuel stream and a purge gas stream which is recycled to step c);
g) sending a portion of said hydrogen fuel stream from step f) and a portion of the said recycled purge gas stream from the step f) to said furnace section of said steam methane reformer unit;
h) feeding a portion of said hydrogen fuel stream from step f) to process fired heaters;
i) purifying and compressing said carbon dioxide rich stream from step b) and optionally carbon dioxide recovered from step e) above for sequestering or use in enhanced oil recovery.

Preferably, step b) utilizes a Selexol or Rectisol absorber to capture the carbon dioxide.

Preferably, step e) utilizes an amine absorber or potassium carbonate absorber to capture the carbon dioxide.

Preferably, step b) utilizes a pressure swing adsorber PSA unit to purify the hydrogen.

Preferably, step f) utilizes a hydrogen membrane in combination with the PSA Unit or utilizes a hydrogen membrane only, high purity hydrogen (generally greater than ninety-nine percent pure) is recovered from PSA unit and lower purity hydrogen is recovered from the hydrogen membrane.

Generally, at least part of hydrogen produced in step b) and hydrogen produced in step f) which are greater than ninety-nine percent pure are utilized in the coal liquefaction facility. In the process, the portion of said recycled purge gas stream from step g) is advantageously less than 10% of the overall recycled purge gas stream, and preferably less than 5% of the overall recycled purge gas stream.

A preferred process includes a step of feeding hydrogen, distillate stream from step a) and a naphtha stream separated from light ends of step a) to a hydrotreating/hydrocracking facility and naphtha, diesel and vacuum gasoil are obtained.

In another terms, the invention is an improved process for reducing the carbon dioxide emissions of a coal liquefaction and/or biomass facility wherein the improvement comprises utilizing a steam methane reformer complex comprising a steam methane reformer unit, a water gas shift unit, a carbon dioxide capture unit, and a hydrogen purification unit, to provide hydrogen to the process fired heaters as well as for other upstream process needs, said steam reformer reactor unit fed by fuel sources from upstream processes.

The overall process results generally in the capture of greater than 80% of the carbon dioxide produced in the facility, often greater than 90%, or even greater than 95% or greater than 97%.

More particularly, the present invention describes a process for reducing the carbon dioxide emissions from a coal and/or biomass to liquids (CBTL) facility by producing and utilizing a low carbon hydrogen stream to fuel the process fired heaters and the precombustion capture of the carbon dioxide stream.

The process can also be described as an improved process for reducing the carbon dioxide emissions of a CBTL facility wherein the improvement comprises utilizing a steam methane reformer complex comprising a steam methane reformer reactor and furnace, a water gas shift unit, a carbon dioxide capture unit, and a hydrogen purification unit, to provide hydrogen to the process fired heaters as well as for other upstream process needs, said steam reformer reactor unit fed by fuel sources from upstream processes.

The feedstocks used in steps a) and b) of the process contain carbonaceous material; they may be identical or different. In the description below, the feed is coal in both steps but it may be any carbonaceous material, as for example biomass, product from the thermochemical conversion of the biomass, organic wastes, petroleum heavy ends, any petroleum converted stream with no or low commercial value (such as petroleum pitch or petroleum coke, . . . ) alone or blended.

DETAILED DESCRIPTION OF THE INVENTION

Figure 1:
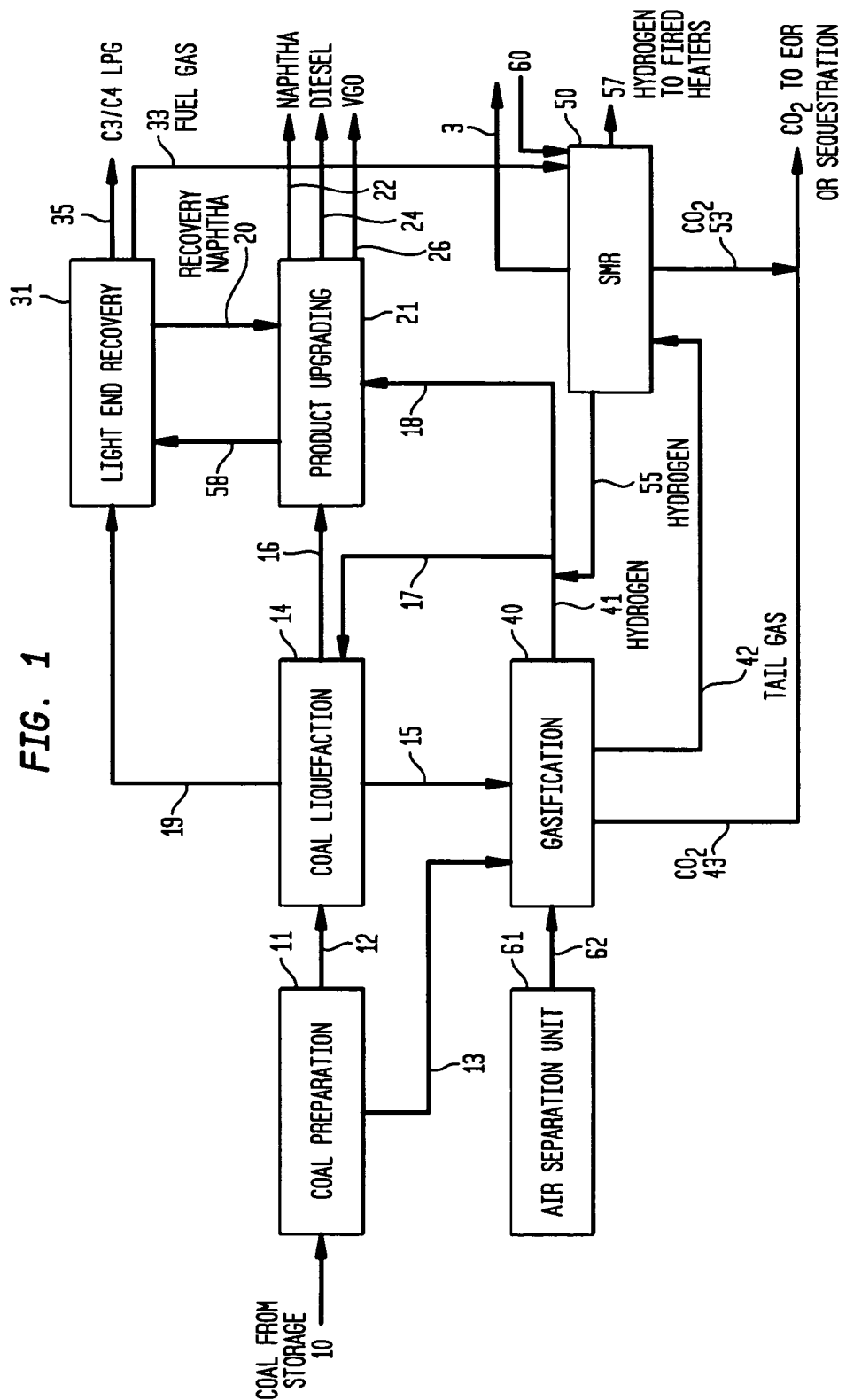
FIG. 1 shows a schematic of a coal liquefaction facility using Applicant's process for reducing carbon dioxide emissions.

In FIG. 1, coal 10 is sent to the coal preparation plant 11. The coal preparation plant dries and sizes the coal as required for the two possible coal destinations. One prepared coal stream 12 may be fed to the coal liquefaction plant 14 and the other prepared coal stream 13 may be fed to the gasification plant 40.

For the specific application of the invention to DCL, the prepared coal 12 plus hydrogen 17 is sent to the direct coal liquefaction complex 14 which includes one or several coal liquefaction reactors operating at high temperature and pressure creates a light ends stream 19, a distillates stream 16, and a heavy residual oil (for example 850F.°+/454° C. containing unconverted carbonaceous material stream 15.

The light ends stream 19 is thereafter sent to a light ends recovery complex 31 to create a possible $C_3/C_4$ LPG stream 35 and a fuel gas stream 33. In some cases all or a portion of the $C_3/C_4$ product stream 35 may be contained in the fuel gas stream 33. The distillates stream 16 plus recovered naphtha 20 from the light ends recovery complex 31 are sent to a hydrotreatment/hydrocracking facility 21 where final products including naphtha 22, diesel 24, and vacuum gas oil 26 are prepared (light ends stream 58, generally C4-, is sent to light end recovery complex 31. Hydrogen 18 is a feedstock to the hydrotreatment/hydrocracking product upgrading plant 21.

The heavy residual oil plus unconverted carbonaceous material stream 15 from the CBTL liquefaction facility 14 and prepared carbonaceous material 13 from the carbonaceous material preparation plant are sent to the gasification facility 40. The gasification facility 40 comprises a gasifier reactor, a water gas shift reactor, acid gas removal unit, carbon dioxide recovery unit, a hydrogen purification unit, and an air separation unit 61 separating oxygen 62 used for gasification. Purified hydrogen 41 from the hydrogen purification unit in the gasification facility 40 is preferably combined with hydrogen 55 from the SMR complex 50 and utilized in the coal liquefaction facility 14 as well as the hydrotreatment/hydrocracking facility 21. A carbon dioxide rich stream 43 from the gasification facility 40 is thereafter sent to purification and compression (not shown in FIG. 1) and utilized for enhanced oil recovery (EOR) or sequestration. Tail or purge gas 42 from the hydrogen purification unit (not shown) of the gasification facility 40 is thereafter sent to a steam methane reformer complex 50.

In the process, separation of hydrogen is maximized such as to recover as much hydrogen as possible.

The tail gas 42 from the gasification facility 40 and fuel gas 33 from the light ends recovery complex 31 are routed to the SMR complex 50. The SMR complex 50 produces hydrogen 55 for process users. 55 (coal liquefaction and product upgrading) and hydrogen 57 for the facility's process fired heaters. High purity $CO_2$ is recovered as stream 53 and sent to purification and compression before utilization for sequestering or EOR. The SMR complex 50 emits a flue gas 3 from the SMR furnace which will be low in $CO_2$ content.

In an advantageous embodiment, naphtha 22 is sent to a catalytic reforming unit (not shown) producing high octane gasoline. It also produces hydrogen which can be used in the present process at several stages, depending on its purity, and in the same manner as described further. Tail gas is also obtained which contains light hydrocarbons, said gas being preferably sent to SMR 50.

Additional details concerning the SMR complex 50 are discussed below and refer to FIG. 2 which is a detailed drawing of the entire steam methane reformer complex labeled as 50 in FIG. 1.

Steam reforming is referred to as steam methane reforming (SMR) and is an efficient and effective method of producing commercial bulk hydrogen. The steam methane reformer with the steam methane reformer complex comprises a steam reformer reactor unit 50b and a furnace section 50a.

The steam reformer reactor unit 50b operates at high temperatures (700-1100° C.) and in the presence of a metal-based catalyst. In the steam reformer reactor unit 50b, the steam 2 reacts with the hydrocarbons in the fuel gas 33, gasifier tail gas purge 42 and recycled SMR purge tail gas 46 (and if needed additional natural gas) to yield carbon monoxide and hydrogen according to the following formula:

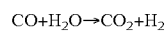

$$C_nH_{2n+2} + nH_2O \rightarrow nCO + (2n+1)H_2$$

Other reactions occurring in the steam reformer reactor unit 50b include the water gas shift according to the formula:

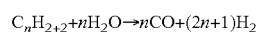

$$CO + H_2O \rightarrow CO_2 + H_2$$

The primary SMR reaction is strongly endothermic and requires high temperatures to obtain high methane conversion rates. The large energy requirement for the SMR process is obtained from oxidation/combustion reactions occurring in the furnace section 50a of the steam reformer complex. The product from the steam reformer reactor unit 50b is a synthetic gas (syngas) 1 containing primarily CO, $CO_2$, $H_2$, $H_2O$ and unreacted $CH_4$.

The syngas 1 created by the steam methane reformer unit 50b within the steam methane reformer complex is then catalytically shifted ($CO + H_2O \rightarrow CO_2 + H_2$) in a water gas shift unit 4 to increase the hydrogen content. The water gas shift reaction is usually carried out in two stages: a high temperature stage, with typical reaction temperatures of about 350-400° C., and a low temperature stage, with typical reaction temperatures of about 180-240° C.

While the lower temperature reactions favor more complete carbon monoxide conversion, the higher temperature reactions allow recovery of the heat of reaction at a sufficient temperature level to generate high pressure steam. For maximum efficiency and economy of operation, it may be advantageous to have a high temperature reaction unit for bulk carbon monoxide conversion and heat recovery, and a low temperature reaction unit for final carbon monoxide conversion.

The resulting gas 9 is sent to an absorber unit 5 to remove the carbon dioxide. The absorber is typically an absorber that utilizes such solvents as monoethanolamine (MEA) and potassium carbonate ($K_2CO_3$). The captured carbon dioxide 53 from the absorber unit 5 is thereafter compressed and exported where it is combined with the carbon dioxide stream (43 in FIG. 1) from the gasification complex (40 in FIG. 1) and used for enhanced oil recovery operations and/or sequestered.

The $CO_2$ lean syngas product 8 is thereafter sent to a hydrogen purification unit 6 which is typically a Pressure-Swing Adsorption (PSA) unit to produce high purity hydrogen. The PSA process is based on the principle that adsorbents are capable of adsorbing more impurities at a higher gas-phase partial pressure than at a lower partial pressure. The impurities are adsorbed in a fixed-bed adsorber at high pressure and then rejected as the system pressure "swings" to a lower level. Hydrogen is essentially not adsorbed. The ability to completely adsorb impurities allows the production of a hydrogen product with very high purity.

The tail gas purge divided in two streams 7 and 46 from the hydrogen purification unit 6 contains a combustible mixture of hydrogen, carbon monoxide, carbon dioxide, and methane and is routed to the SMR unit with the largest fraction (>80%) 46 sent to the reactor section 50b and, the smaller fraction 7 routed to the furnace section 50a to reduce impurities such as nitrogen and argon from the hydrogen product. The SMR furnace 50a provides the heat for the endothermic reforming reaction and also produces a significant quantity of high pressure steam 8. The SMR furnace 50a is fed by the relatively small flowrate of PSA tail gas purge 7 and hydrogen 56 from the PSA 6. The low carbon content of the combined fuel to the SMR furnace 50a will result insignificant reduction in the amount of $CO_2$ in the resultant flue gas 3 emitted to the atmosphere from the SMR furnace 50a. If necessary, natural gas 60 can be added to the steam reforming reactor 50b.

Figure 2:
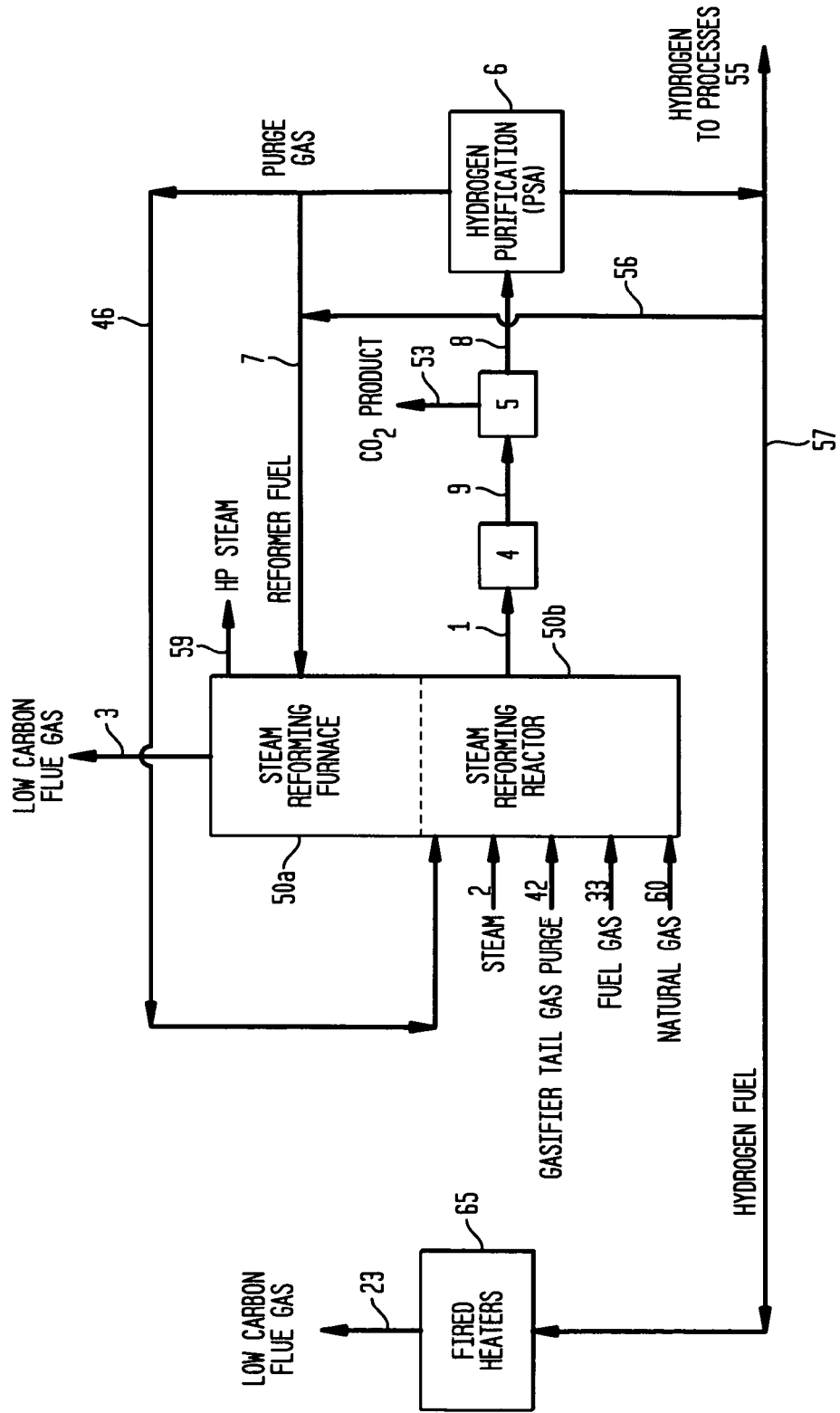
FIG. 2 is more detailed schematic of the configuration of the SMR complex utilized for the invention.
Figure 3:
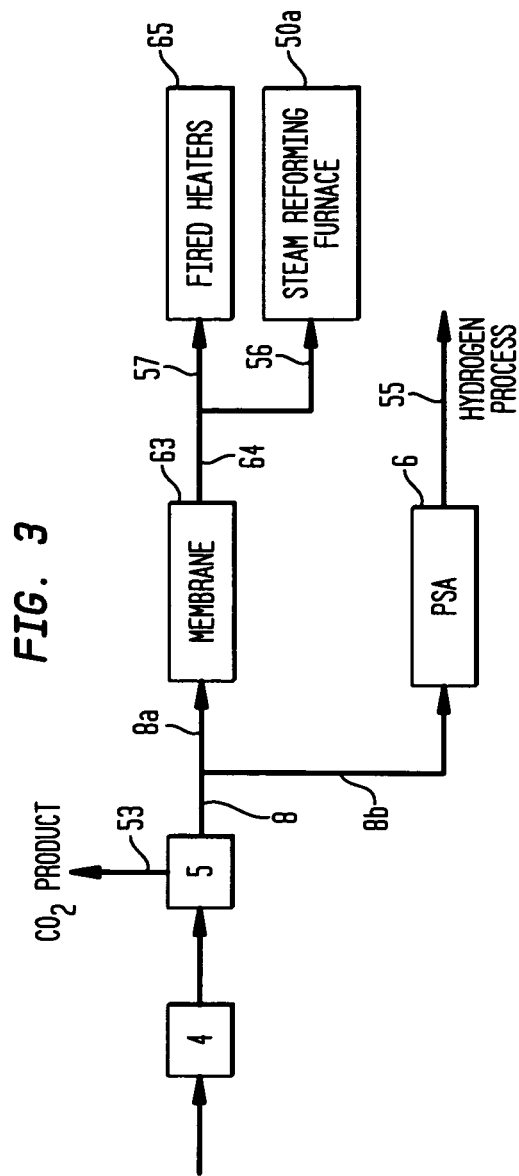
FIG. 3 shows an alternative method of purifying hydrogen.

In some cases it is preferred as shown in FIG. 3, to take the product syngas 8 from the $CO_2$ absorber unit 5 and split it in two streams 8a and 8b between a hydrogen membrane 63 and the aforementioned PSA hydrogen purification system 6. Since the hydrogen stream 55 from the PSA will be of higher purity it would thereafter be preferably utilized for process users (hydrotreating, CBTL, etc.). The hydrogen stream 64 from the lower cost hydrogen membrane unit will be of lower purity and lower pressure and utilized (line 57) for the plant fired heaters 65, the steam reformer furnace unit 50a (line 56). As shown in FIG. 2, low carbon flue gas 23 is emitted from the plant fired heaters 65.

FIG. 2, the higher purity (99%+) hydrogen product from the PSA hydrogen purification unit 6 within the steam methane reformer complex is routed to multiple users, including stream 55 to the process users (coal liquefaction facility 14 and the hydrotreating/hydrocracking facility 21 in FIG. 1), stream 56 which is combined with the purge gas stream 7 from the PSA unit 6 and sent to the SMR furnace unit 50a, and stream 57 to the facility's fired heaters. In the case of both a hydrogen membrane and PSA unit for hydrogen purification, the lower purity hydrogen stream (90%-99%) from a membrane system would be used for the SMR furnace fuel and fired heater fuel (streams 56 and 57).

Importantly, the low carbon content fuel to the facility fired heaters and to the SMR furnace unit 50a will result in significant reduction in the amount of $CO_2$ in the resultant flue gas emitted to the atmosphere as well as the production of a high purity $CO_2$ product which can be sequestered or utilized for EOR. High pressure steam 59 is a by-product from the SMR complex 50.

This invention will be further described by the following example cases, which should not be construed as limiting the scope of the invention.

EXAMPLE

In this example, 8,000 STPD (dry basis) of an Illinois No. 6 coal is processed in a H-Coal$_{TS}$ direct coal liquefaction (DCL) facility to produce finished products including LPG, butanes, gasoline, ultra low sulfur diesel (ULSD) and a low-sulfur fuel oil product. The raw liquids from the DCL Plant are further upgraded in standard refinery operations. This example provides two comparative cases, a pre-invention case and a case that utilizes Applicant's novel process.

Case 1

The unconverted coal, heavy liquefaction residue and supplemental coal are fed to a gasification plant to provide plant hydrogen. Fuel gas is produced from the H-Coal$_{TS}$ Unit, secondary hydroprocessing units and the gasification PSA tail gas.

In the pre-invention case, $CO_2$ capture is utilized in the gasification plant to attain approximately 87% capture of the total $CO_2$ produced in the gasification plant and 75% of the total liquefaction facility. The plant fired heaters are fueled by a blend of the gasifier tail gas and process generated fuel gases. There is no SMR Unit in the pre-invention case with all hydrogen generated via gasification of the H-Coal bottoms and supplemental coal. A summary of the key plant inputs and products is shown in Table 1. As shown in the table, the pre-invention case requires 1,972 STPD of supplemental coal feed to gasification to provide the total plant hydrogen requirements (224 MM SCFD). The total $CO_2$ emitted to the atmospheric is 2,847 STPD.

Case 2

In the case that utilizes Applicant's invention, a SMR Unit is added to process fuel gas from the plant, tail gas purge from the pressure swing absorber unit in the gasification complex, and tail gas from the pressure swing absorber unit that is part of this SMR unit to produce hydrogen and capture the $CO_2$ produced The SMR furnace is fed by SMR produced hydrogen and a small quantity of the SMR PSA tail gas. Details of the invention case SMR Unit operation are shown in Table 2. As shown in the table, 137.5 MM SCFD of hydrogen (99.9 V % purity) is produced in the SMR Unit. This hydrogen is used as follows: 55.0 MM SCFD to the SMR furnace, 55.6 MM SCFD to the liquefaction complex fired heaters (in place of fuel gas), and 26.9 MM SCFD to process plants including the liquefaction reactors. The latter hydrogen reduces that required from the gasifier and results in lower supplemental coal required.

As shown in Table 1, the supplemental coal to the gasifier is reduced from 1,972 (pre invention case) to 1,437 STPD with a significant investment and operating cost savings. The SMR Unit also produces a large quantity of steam and can replace a coal or natural gas fired boiler as in the pre-invention case. The net plant power consumption for invention case is significantly higher than the pre-invention case as a result of higher hydrogen compression duty and less high pressure steam which is letdown via steam turbines. With power provided via combined cycle gasification with $CO_2$ capture, the affect on the total $CO_2$ emitted (included imported power) is minimal.

The addition of the SMR Unit and use of produced hydrogen for fired heaters results in a 27% reduction in the quantity of supplemental coal to the gasifier and an increase in the $CO_2$ recovered from 75 to 97.6%. This is accomplished with a small effect on the overall plant investment.

TABLE 1

Summary of Flowrates
Basis: 8,000 STPD MF Coal to Coal Liquefaction

|  | Units | Base Case | Invention |
|---|---|---|---|
| Inputs |  |  |  |
| Dry Coal to Liquefaction | STPD | 8,000 | 8,000 |
| Dry Coal to Gasification | STPD | 1,972 | 1,437 |
| Total Coal Feed | STPD | 9,972 | 9,437 |
| Imported Power | MW | 124 | 210 |
| Products |  |  |  |
| LPG + Butanes | BPSD | 2,619 | 2,619 |
| Gasoline | BPSD | 7,218 | 7,218 |
| ULSD | BPSD | 18,258 | 18,258 |
| Fuel Oil | BPSD | 3,081 | 3,081 |
| Total Liquids | BPSD | 31,177 | 31,177 |
| Hydrogen Required |  |  |  |
| Process (MM = $10^6$) | MM SCFD | 224 | 224 |
| Fuel for Fired Heaters | MM SCFD | 0 | 111 |
| Total | MM SCFD | 224 | 334 |
| $CO_2$ Produced | STPD | 11,541 | 10,154 |
| $CO_2$ Captured | STPD | 8,694 | 9,906 |
| Capture Efficiency | % | 75 | 97.6 |
| Thermal Efficiency | % | 62.1 | 61.0 | in the metric system:
1 STPD = 0.907 tons/d;
1 SCFD = 0.028 m³/d;
1 BPSD = 0.159 m³/d

TABLE 2

SMR Operation

| Item | Units | Value |
|---|---|---|
| Process Feedstocks |  |  |
| Process Fuel Gas | MMSCFD | 35.0 |
| Gasifier PSA Tail Gas | MMSCFD | 38.1 |
| Recycle SMR PSA Tail Gas | MMSCFD | 67.5 |
| Total | MMSCFD | 140.6 |
| Steam (1 Lb = 0.454 kg) | Lb/Hr | 215,000 |
| Furnace Fuel |  |  |
| SMR PSA Tail Gas | MMSCFD | 3.6 |
| Hydrogen | MMSCFD | 55.0 |
| Total | MMSCFD | 58.6 |
| Products |  |  |
| HP Steam | M Lb/Hr | 192 |
| Total Hydrogen | MM SCFD | 137.5 |
| To Reformer Furnace |  | 55.0 |
| To Plant Fired Heaters |  | 55.6 |
| To Process Users |  | 26.9 |
| Carbon Dioxide |  |  |
| Captured | STPD | 2,434 |
| Emitted (Net of $CO_2$ in Air) | STPD | 68 |
| PSA Tail Gas (Recycled & Purged) | MM SCFD | 71.1 |

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

We claim:

1. A process for reducing the carbon dioxide emissions in a facility treating carbonaceous material by liquefaction comprising:
    a) feeding a first feed of carbonaceous material and hydrogen under liquefaction conditions to one or more liquefaction reactors to create a light ends stream, a distillate stream, and a heavy ends; and separating from said light ends stream a LPG stream, a naphtha stream and a fuel gas;
    b) gasifying said heavy ends and a second feed of carbonaceous material in a gasification complex comprising a gasifier reactor, a sour gas removal unit, a water gas shift unit, a carbon dioxide absorption unit, and a hydrogen purification unit, and recovering a purified hydrogen stream comprising greater than 99 volume percent hydrogen, a tail gas purge stream and a carbon dioxide rich stream;
    c) feeding said tail gas purge stream, said fuel gas recovered from the light ends stream in step a), and a recycled purge gas stream from step f) to a reactor section of a steam methane reformer unit comprising said reactor section and a furnace section, to create a synthetic gas stream;
    d) shifting said synthetic gas stream catalytically using a water gas shift unit to create a shifted synthetic gas stream;
    e) capturing the carbon dioxide from said shifted synthetic gas stream through a carbon dioxide absorption process;
    f) purifying the hydrogen remaining in said shifted synthetic gas stream after step e) in a hydrogen purification unit to create at least a hydrogen fuel stream comprising greater than 99 mole percent hydrogen and a purge gas stream which is recycled to step c);
    g) sending a portion of said hydrogen fuel stream from step f) and a portion of the said recycled purge gas stream from the step f) to said furnace section of said steam methane reformer unit;
    h) feeding a portion of said hydrogen fuel stream from step f) to process fired heaters;
    i) purifying and compressing said carbon dioxide rich stream from step b) and optionally carbon dioxide recovered from step e) above for sequestering or use in enhanced oil recovery.

2. The process of claim 1 wherein step b) utilizes a Selexol or Rectisol absorber to capture the carbon dioxide.

3. The process of claim 1 wherein step e) utilizes an amine absorber or potassium carbonate absorber to capture the carbon dioxide.

4. The process of claim 1 wherein steps b) and step f) utilize a pressure swing adsorber (PSA) unit to purify the hydrogen.

5. The process of claim 1 wherein step f) utilizes a hydrogen membrane in combination with said hydrogen purification unit or utilizes a hydrogen membrane only, high purity hydrogen (greater than ninety-nine mole percent pure) is recovered from said hydrogen purification unit and lower purity hydrogen stream of between 90 to 99 mole percent purity is recovered from the hydrogen membrane.

6. The process of claim 1 wherein the overall process results in the capture of greater than 80% of the carbon dioxide produced in the facility.

7. The process of claim 1 wherein the overall process results in the capture of greater than 90% of the carbon dioxide produced in the facility.

8. The process of claim 1 wherein the overall process results in the capture of greater than 95% of the carbon dioxide produced in the facility.

9. The process of claim 1 wherein the portion of said recycled purge gas stream from step g) is less than 10% of the overall recycled purge gas stream.

10. The process of claim 1 wherein the portion of said recycled purge gas stream from step g) is less than 5% of the overall recycled purge gas stream.

11. The process of claim 1 further comprising a step of feeding hydrogen, distillate stream from step a) and a naphtha stream separated from light ends of step a) to a hydrotreating/hydrocracking facility and naphtha, diesel and vacuum gasoil are obtained.

12. The process of claim 1 wherein at least part of hydrogen produced in step b) and hydrogen produced in step f) which are greater than ninety-nine mole percent pure are utilized in the facility treating carbonaceous material by liquefaction.

\* \* \* \* \*